United States Patent [19]
Nose et al.

[11] Patent Number: 5,793,446
[45] Date of Patent: Aug. 11, 1998

[54] PROJECTOR UTILIZING COMPRESSED WHITE SIGNAL

[75] Inventors: Junichi Nose; Masanori Kojima; Kenji Kimura; Hideo Arahama; Hideki Kaneko; Kenji Maeno; Naoto Kontani. all of Nagaokakyo, Japan

[73] Assignee: Mitsubishi Denki Kabushiki Kaisha. Tokyo, Japan

[21] Appl. No.: 527,684

[22] Filed: Sep. 13, 1995

[30] Foreign Application Priority Data

Apr. 20, 1995 [JP] Japan .................. 7-095024

[51] Int. Cl.⁶ .................................. H04N 9/31
[52] U.S. Cl. ............. 348/751; 348/761; 348/790; 348/766; 348/744
[58] Field of Search ................ 348/751, 761, 348/744, 750, 752, 757, 756, 766, 790, 758, 779, 781, 791; 353/20, 34; H04N 9/31

[56] References Cited

U.S. PATENT DOCUMENTS

| | | | |
|---|---|---|---|
| 4,796,978 | 1/1989 | Tanaka et al. | 350/337 |
| 5,387,953 | 2/1995 | Minoura et al. | 353/20 |
| 5,477,280 | 12/1995 | Ko | 348/744 |
| 5,629,743 | 5/1997 | Lee et al. | 348/751 |
| 5,663,775 | 9/1997 | Kawamura et al. | 348/751 |

FOREIGN PATENT DOCUMENTS 0343729 11/1989 European Pat. Off. .

OTHER PUBLICATIONS

"Color Image Receiving Apparatus" Dec. 1, 1968–pp. 9–15.

*Primary Examiner*—Glenton B. Burgess

[57] ABSTRACT

In a projector having liquid crystal panels as light modulators, the liquid crystal panels are independently used for white-light modulation and colored-light modulation, respectively, so that high luminance and high resolution are compatibly attained. The projector has a liquid crystal panel which is driven by color signals, and which subjects light to colored-light modulation, and another liquid crystal panel which is driven by a luminance signal wherein a portion lower than a predetermined level is compressed by a compressing circuit, and which subjects light to white-light modulation. Modulated light outputted from the two liquid crystal panels are synthesized with each other in a polarized beam splitter, and the image of the synthesized light is formed on a screen by a lens. It is preferable that the color signal and the white signal which will be inputted to the liquid crystal panels are obtained from a composite video signal of the NTSC system.

17 Claims, 6 Drawing Sheets

PROJECTOR UTILIZING COMPRESSED WHITE SIGNAL

BACKGROUND OF THE INVENTION

1. Field of the Invention

The invention relates to a projector having liquid crystal panels as light modulation means, and particularly to a video signal source for a projector which processes a composite video signal and outputs it to light modulation means, or which interfaces between a so-called video signal system and an optical system.

2. Description of Prior Art

FIG. 1 is a diagram showing the configuration of a prior art liquid crystal projector in which light modulation is conducted by a liquid crystal panel. In FIG. 1, 1 designates a lamp which emits white light, and 2 designates a reflecting mirror which reflects the emitted light. The lamp 1 and the reflecting mirror 2 constitute a projection light source. The reflecting face of the reflecting mirror 2 is formed as a parabolic face. The lamp 1 is located approximately at the focal point of the parabolic face so that approximately parallel emitted light is obtained. In a forward position in the emitted direction of the emitted light, a liquid crystal panel 20 which modulates passing intensities of incident lights by three primary color signals R, G, and B, or which conducts light modulation is disposed. In front and rear of the liquid crystal panel 20, polarizing plates 31 and 32 are respectively disposed so that the light modulation in the liquid crystal panel 20 can be effectively conducted. In the forward position of the polarizing plate 31, a lens 3 and a screen 4 are disposed. The light outputted from the liquid crystal panel 20 is imaged on the screen 4 by the lens 3, so that an image is displayed on the screen 4.

The reference numeral 30 designates a video signal source which has a so-called video signal processing function and an outputting function, or which outputs color signals R, G, and B that are used for driving the liquid crystal panel 20, from a signal of a composite video signal source 5. The video signal source 30 has: the composite video signal source 5 which outputs a composite video signal consisting of a luminance signal and a carrier chrominance signal (a signal having color information); a Y/C separating circuit 6 which separates the composite video signal of the composite video signal source 5 into a carrier chrominance signal C and a luminance signal Y'; a color demodulating circuit 7 which demodulates the carrier chrominance signal C into color difference signals R'-Y', B'-Y', and G'-Y'; three adders 8 which add the luminance signal Y' to the color difference signals R'-Y', B'-Y', and G'-Y', thereby obtaining color signals R', G', and B'; and three extending circuits 11 which subject the obtained color signals R', G', and B' to gamma inverse correction, thereby outputting color signals R, G, and B for driving the liquid crystal panel 20. The extending circuits 11 can have the function of compensating the non-linearity of the liquid crystal panel 20, in addition to that of gamma inverse correction. In the specification and drawings, the symbol "'" indicates that a signal having the symbol has undergone gamma correction.

Gamma correction is determined by the type of the video signal of the video signal source. Specifically, gamma correction is conducted so that, in a whole system comprising: a video camera which converts image light into a video signal; a transmission channel for transmitting the video signal; and a display apparatus such as a CRT which demodulates the signal transmitted through the transmission channel into the video signal and converts the demodulated video signal into image light, the relationship between the image light entered into the video camera as the initial input information and the final image light outputted from the display apparatus is eventually changed linearly for the human eyes.

When the luminance of an object to be displayed is designated by S, the output voltage of the camera by Ei, the input voltage applied to the display apparatus by Eo, the luminance of the image reproduced by the display apparatus by So, and the gamma values of the static characteristics of the camera and display apparatus systems by $\gamma c$ and $\gamma d$, respectively, they have the following relationships:

$$Ei = S^{\gamma c} \tag{1}$$

$$So = Eo^{\gamma d} \tag{2}$$

If the camera and the display apparatus are directly connected to each other, i.e., if Ei in expression (1) is regarded as Eo in expression (2), the relationship is obtained as in expression (3) below:

$$So = Eo^{\gamma d} = (S^{\gamma c})^{\gamma d} = S^{(\gamma c + \gamma d)} \tag{3}$$

In other words, the luminance So of the image reproduced by the display apparatus is obtained as $S^{(\gamma c + \gamma d)}$, and is exponentially expressed. The value of the exponent $\gamma c + \gamma d$ is, for example, 2 or more. For this reason, even if the human visual sense can logarithmically cope with the reproduced image, the value is so excessive that the white level is visually artificial. Specifically, the white level glows at a level higher than the white level of the object to be displayed, or the gradation of black levels cannot be sufficiently represented. For example, the color of the black body of a steam locomotive is viewed as being brownish black. In order to correct this point, and in order not to increase the dynamic range of the transmission system up to a level higher than necessary, conducted are compression, and signal processing for an inverse value $(= 1/(\gamma c + \gamma d + \alpha))$, where $\alpha$ is a compression constant in the transmission channel) of the exponent $\gamma c + \gamma d$ of expression (3) in view of the value of the exponent. This processing is called gamma correction. If the signal processing is conducted, it is expressed as that a signal has undergone gamma correction. In FIG. 1, for example, the luminance signal which has undergone gamma correction is indicated by Y'. Gamma inverse correction is to conduct the processing according to expression (3) to extend a signal which has been compressed, thereby realizing good linearity in the relationship between the input and output.

Next, the operation will be described. The composite video signal from the composite video signal source 5 is separated into a carrier chrominance signal C and a luminance signal Y' in the Y/C separating circuit 6. The carrier chrominance signal C is demodulated into color difference signals R'-Y', B'-Y', and G'-Y' in the color demodulating circuit 7. The luminance signal Y' is added to the color difference signals R'-Y', B'-Y', and G'-Y', respectively, in the corresponding adders 8, thereby obtaining color signals R', G', and B'. Since the color signals have undergone compression of, for example, about the 2.4th root which is called gamma correction during the signal generation, gamma inverse correction of the 2.4th power is conducted in the respective extending circuits 11. The resultant color signals R, G, and B having good linearity, i.e., having a proportional relationship between the level of an object for generating the input video signal and the luminance level on the screen 4 are outputted to the liquid crystal panel 20 from the video signal source 30. The liquid crystal panel 20 is driven by the color signals R, G, and B which have undergone gamma inverse correction, and the light emitted from the projection light source consisting of the lamp 1 and the reflecting mirror 2 is subjected to light modulation. The modulated light is imaged on the screen 4 by the lens 3, so that an image is displayed on the screen 4.

When light is projected onto the screen 4 having a size of 40 inches, for example, by the prior art liquid crystal projector, the illuminance of 1,000 luces is attained. On the other hand, by a projector of the cathode ray tube type, the illuminance of about 2,000 luces can be obtained on a screen having the same size. Accordingly, it is desired that the illuminance of a liquid crystal projector is further improved. For example, the illuminance is desired to be improved to be about twice as high as that of the prior art liquid crystal projector. In the liquid crystal panel 20, furthermore, pixels are shared among three primary colors of red, green, and blue in order to reproduce a color image, so that the number of pixels which contribute to the resolution is 1/3 of the total number of the pixels. Therefore, the improvement in resolution is also desired.

SUMMARY OF THE INVENTION

It is the primary object of the invention to provide a liquid crystal projector in which light having chrominance, or colored light, and white colored light, or white light corresponding to resolution are respectively modulated by different liquid crystal panels, and the modulated lights are synthesized with each other, whereby both illuminance and resolution can be improved as compared with a prior art projector.

The technical concepts which support the foundations of the invention are based on the following ideas. A conventionally used composite video signal which is obtained by superimposing a luminance signal on a carrier chrominance signal has, as a matter of fact, a characteristic for solving the two problems (low illuminance and low resolution) in a prior art liquid crystal projector, and it is noted that the conventional video signal source 30 can positively be used for complying with the human visual sense which will be described later. Characteristics of a composite video signal are described in "COLOR IMAGE RECEIVING APPARATUS" by ISHIBASHI, published by NIHON HOSO SHUPPAN KYOKAI, Dec. 1, 1968, the 6th printing, pp. 9–15. Hereinafter, the characteristics are sequentially described on the basis of the summary of the book. As for the human eyes, the visual acuity in color difference for distinguishing the difference in color is extremely lower than the visual acuity for distinguishing the difference in brightness. Accordingly, in the color television broadcasting, the amplitude of the transmitted saturated color signal is about ½ of that of the luminance signal. The band of the color signal is 0.5 MHz or 1/8.4 of that of the luminance signal which is 4.2 MHz. The invention utilizes these characteristics so that the problems are solved in the following manner.

Among saturated colors, yellow has the maximum composite video signal level. When the levels of the saturated three primary color signals (specifically, the color signals R and G) are assumed to be 1, the luminance signal level is 0.89. The maximum value of the carrier chrominance signal level of a frequency of 3.58 MHz is 0.44, and the maximum value of the composite video signal level for yellow is 1.33 (=0.89+0.44). That is, with respect to only the luminance signal, the amplitude of 1.33 can be represented at the maximum by the composite video signal. In addition, for example, if gamma inverse correction by the 2.4th power is conducted, it is possible to output a luminance signal having an amplitude of 2 ($\neq 1.33^{2.4} = 1.9826...$) with respect to the amplitude of 1 of the saturated colors in color display, to the liquid crystal panel of the display apparatus. Accordingly, in an optical system including one liquid crystal panel, the color modulation and projection are conducted with, for example, amplitudes lower than 1 which is a half of 2, and in an optical system including another liquid crystal panel, the white-light modulation and the projection are conducted with a white signal indicating the gradation of white color based on the luminance signal Y which has undergone gamma inverse correction having amplitudes from 1 to 2. As a result, the illuminance can be doubled. This is the first technical concept which supports the invention.

In addition, in most image receiving apparatus, the band of the R-Y and B-Y signals which constitute the carrier chrominance signal of the composite video signal is 0.5 MHz centered on 3.58 MHz, which is equal to that of the Q signal. The band is very narrower than the band of the luminance signal or 4.2 MHz. Accordingly, when one liquid crystal panel which conducts the colored-light modulation has pixels corresponding to 0.5 MHz and another liquid crystal panel which conducts the white-light modulation has pixels corresponding to 4.2 MHz, the problem in resolution can be solved. This is the second technical concept which supports the invention.

The above-described technical concepts of the invention using the composite video signal are based on the characteristics of the human eyes. Accordingly, even if the RGB signals are used as the signal for driving the liquid crystal panel, instead of the composite video signal, and the technique of the invention is applied, the levels which can be practically used for the human eyes can be obtained. This is because a bright color glows and is viewed as being whitish. In the above-described background of the two technical concepts which support the invention, the summary of the invention will be described below.

The projector of the invention comprises: colored-light modulation means for conducting colored-light modulation according to a color signal, thereby obtaining colored light; white-light modulation means for conducting white-light modulation according to a compressed white signal obtained by compressing a portion of a white signal indicative of the white gradient which is lower than a vicinity of a first predetermined level, thereby obtaining white light; and synthesizing means for synthesizing the obtained colored and white lights with each other.

In the projector of the invention, an image is composed of colored light which is subjected by the colored-light modulation means to colored-light modulation according to color signals that have undergone gamma inverse correction, and white light which is subjected by the white-light modulation means to white-light modulation according to a compressed white signal wherein a portion lower than a predetermined level is compressed. The colored-light modulation conducts image reproduction of chrominance ranging to the saturated color level outputting the maximum color-modulated light. White up to the saturated color level (additive color mixing of three primary color signals of the same level) is dealt by the colored-light modulation conducted by the colored-light modulation means, and white exceeding the first predetermined level is dealt by the white-light modulation conducted by the white-light modulation means.

Therefore, a signal which is higher in level than that obtained when a conventional liquid crystal panel for three primary colors reproduces not only chrominance but also white gradation can be inputted to the white-light modulation means. When a signal of a white object having a level higher than the first predetermined level is inputted, the colored-light modulation means reaches the dynamic range in which the maximum color-modulated light is outputted, and emits white light of a constant illuminance. At the same time the white-light modulation means emits white light which is white-light modulated with a compressed white signal of a portion exceeding the first predetermined level. On the other hand, the white-light modulation means does not conduct white-light modulation on a white signal the level of which is equal to or lower than the first predetermined level, and substantially blocks white light. The white-light modulation means emits white light on the basis of the illuminance of the portion exceeding the first predetermined level. When the thus obtained colored and white lights are synthesized with each other to constitute an image, therefore, the illuminance is naturally higher than that obtained in a prior art projector. When the resolution of the white-light modulation means is selected so as to be higher than that of the colored-light modulation means, the resolution of a color image can be improved without producing artificiality.

In the projector of the invention, color signals r, g, and b inputted to the colored-light modulation means are color signals in which level portions higher than a vicinity of a second predetermined level of R, G, and B signals which have undergone gamma inverse correction are compressed. In short, level portions of the color signals R, G, and B which are equal to or higher than the second predetermined level are compressed to be a constant value. The color signal is suppressed to a constant value with using the second predetermined level which is common to the color signals r, g, and b, in the following cases; where a color signal having a level exceeding a predetermined level is supplied to the colored-light modulation means, the light of the color modulation means cannot be made constant because of the difference in saturated color levels at which the maximum color modulated light of each color of red, green, and blue is outputted; or where an unnecessary noise is generated when a signal having a level equal to or higher than each saturated color level is inputted to the colored-light modulation means. Accordingly, when the second predetermined level is reached, the color signals r, g, and b are made to be the same in level and have a constant value, so that the colored-light modulation means reproduces and outputs a white color with good white balance, and the drawbacks in the prior art can be previously prevented.

The first predetermined level is different from the second predetermined level. The first and second predetermined levels for determining the threshold levels at which the compression of the white signal and the color signals r, g, and b is conducted can independently be set in view of the relationship between the colored-light modulation means and the white-light modulation means. Accordingly, the sharing of the light modulation of the color signal and the white signal to the liquid crystal panels can be adjusted. For example, the chrominance or the white balance can be adjusted in accordance with the video software, or the gradation of black levels and white levels can easily be adjusted.

In the projector of the invention, the band of the color signal (or the compressed color signal) which is inputted to the colored-light modulation means is made narrower than that of the compressed white signal which is inputted to the white-light modulation means. When a signal having a frequency f1 which is equal to or higher than a spatial frequency band f0 corresponding to the number of pixels arranged at predetermined pitch intervals in the colored-light modulation means is inputted to the colored-light modulation means, the colored-light modulation means is driven by the signal having the frequency f1 which is equal to or higher than the spatial frequency f0. As a result, there may be a case where a frequency f2 (=f1−f0) is generated, for example, as a difference between the spatial frequency f0 which is determined by the predetermined pitch and the number of pixels and the frequency f1 of the signal. The generation of the frequency is observed as an interference phenomenon on the display screen, that is, so-called aliasing interference occurs. By setting the color signal band narrower, the aliasing interference can be prevented from occurring.

In the projector of the invention, a luminance signal Y' which has undergone gamma correction is added to color difference signals R'-Y', G'-Y', and B'-Y' which have undergone gamma correction, thereby generating color signals R', G', and B' which undergo gamma correction, and the signals are subjected to gamma inverse correction, thereby generating R, G, and B, so as to obtain color signals r, g, and b which will be inputted to the colored-light modulation means. The colored-light modulation means having a liquid crystal panel cannot be driven directly by the composite video signal. In a projector of the cathode ray tube type, a method may be employed in which the grid is driven by a color difference signal which is obtained by demodulating the carrier chrominance signal separated from the composite video signal and then by conducting gamma correction on the demodulated signal, and the cathode is driven by the luminance signal which has also undergone gamma correction. By using the color signals R', G', and B' which have undergone gamma correction and are obtained by adding the color difference signals to the luminance signal, the input signal form can be commonly used in the cathode of the cathode ray tube and the liquid crystal of the liquid crystal panel. In addition, also the white-light modulation means can be driven on the basis of the luminance signal Y' which has been used in the above. The color difference signals and the luminance signals which are used in a projector of cathode ray tube type are commonly used, so that a rationalized configuration can be realized. Moreover, the input information for a projector of the cathode ray tube type in which the grid is driven by the color difference signal and the cathode by the luminance signal, and that for the liquid crystal projector of the invention are made to have substantially the same quality, so that the comparative study between them can easily be performed.

In the projector of the invention, the color signals R', G', and B' which have undergone gamma correction are synthesized with each other, and the synthesized signal is subjected to gamma inverse correction, thereby obtaining a white signal. That is, from the output of a matrix circuit receiving the three primary color signals R', G', and B' which have undergone gamma correction, the luminance signal Y' is obtained. Then, the projector is configured in such a manner that it can be driven only by the input of the color signals R', G', and B'. When the three primary color signals R', G', and B' are used, the color signals R', G', and B' can be directly used as the input of the colored-light modulation means. The input of the white-light modulation means is required to be produced from the color signals R', G', and B', but the luminance signal Y' which is produced by synthesizing the color signals R', G', and B' can be utilized as the input. Accordingly, a rationalized input configuration which can cope with the three primary color signals R', G', and B' can be realized.

In the projector of the invention, the white signal is produced from an achromatic signal corresponding to the minimum value of the three primary color signals R', G', and B' which have undergone gamma correction. That is, the white signal is produced from the minimum value of the color signal which has undergone gamma correction. The signal corresponding to the minimum value of the primary color signals R', G', and B' of red, green, and blue which have undergone gamma correction is used as the achromatic signal. The achromatic signal is subjected to gamma inverse correction, so that the white signal is produced. Accordingly, the color saturation of high luminance is prevented from being lowered. When the white signal is produced from the output of the matrix circuit receiving the three primary color signals R', G', and B', the sum of the luminance components of the white signal and the color signals serves as the illuminance on the screen, so that the luminance signal is excessive. If an image is reproduced by the additive color mixing of the colored image light and the white image light, therefore, the color saturation on the video screen can easily be lowered. The portions which are synthesized in accordance with the minimum levels of the respective primary color signals R', G', and B' of red, green, and blue which have undergone gamma correction can be modulated by the white-light modulation means, and the remaining portions of the color signals can be modulated by the colored-light modulation means. Therefore, by using the white signal which is produced by this configuration, the color saturation in the liquid crystal panel for the colored-light modulation can be prevented from being lowered by the luminance components of the color signals which are not included. As a result, both the liquid crystal panels are driven in a region in which the transmittance is linearly changed with respect to the input signal level of each liquid crystal panel, so that the colored-light modulation and the white-light modulation are conducted without causing saturation, and hence a good chrominance can be attained. The gradation in the reproduced image is improved.

In the projector of the invention, the white signal is produced from a signal obtained by adding an achromatic signal corresponding to the minimum value of the color difference signals which have undergone gamma correction, to the luminance signal which has undergone gamma correction. That is, the white signal is obtained based on the signal obtained by adding the minimum value of the color difference signals which have undergone gamma correction to the luminance signal which has undergone gamma correction. The white signal is produced based on the minimum value information of the color signals, so that substantially same advantages and effects can be attained as those in the above-described case where the white signal is produced from the minimum value of the color signal which has undergone gamma correction.

In the projector of the invention, the colored-light modulation means has a single liquid crystal panel in which the colored-light modulation means consists of three primary color pixels, and the colored-light modulation is conducted by the single liquid crystal panel. Accordingly, the colored-light modulation means can have a simple configuration, and the full-color image can readily be obtained.

In the projector of the invention, the colored-light modulation means has three liquid crystal panels for red, green, and blue, and the colored-light modulation is conducted by the three liquid crystal panels of red, green, and blue. For example, in the case where the liquid crystal panels have the equal number of pixels and the aperture ratio (a ratio of the effective light transmission area to the pixel area of the liquid crystal panel) is 30%, if the input light is separated into colored lights of red, green, and blue, and the lights transmitted through the corresponding liquid crystal panels are synthesized again, the light transmitted through the liquid crystal panels can be obtained with the efficiency of 30%. On the other hand, in a single liquid crystal panel, the pixels are divided into three portions, and red, green, and blue filters are attached thereto, respectively, so that the transmission efficiency is reduced to ⅓ or 10%. Accordingly, the configuration having three liquid crystal panels has a tripled efficiency.

In the projector of the invention, color signals r, g, and b and a white signal which have undergone gamma inverse correction are obtained from the composite video signal. Consequently, the above-described characteristics of the composite video signal can be utilized sufficiently and positively.

In the projector of the invention, the compression of the color signals and the white signal which are equal to or higher than a predetermined level, or equal to or lower than a predetermined level is conducted by first and second signal processing means having non-linear input/output characteristics. The first and second signal processing means utilize the non-linear input/output characteristics of a diode. By a relatively simple nonlinear circuit, the color signals and the white signal can be compressed at the predetermined level. Particularly, the use of a diode enables a very simple compression processing to be conducted.

In the projector of the invention, the first signal processing means is cascaded to extending means for extending the luminance signal which has undergone gamma correction, and the low level of the white signal which has undergone gamma inverse correction is compressed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Hereinafter, the invention will specifically be described with reference to the drawings showing its embodiments.

Embodiment 1

Figure 1:
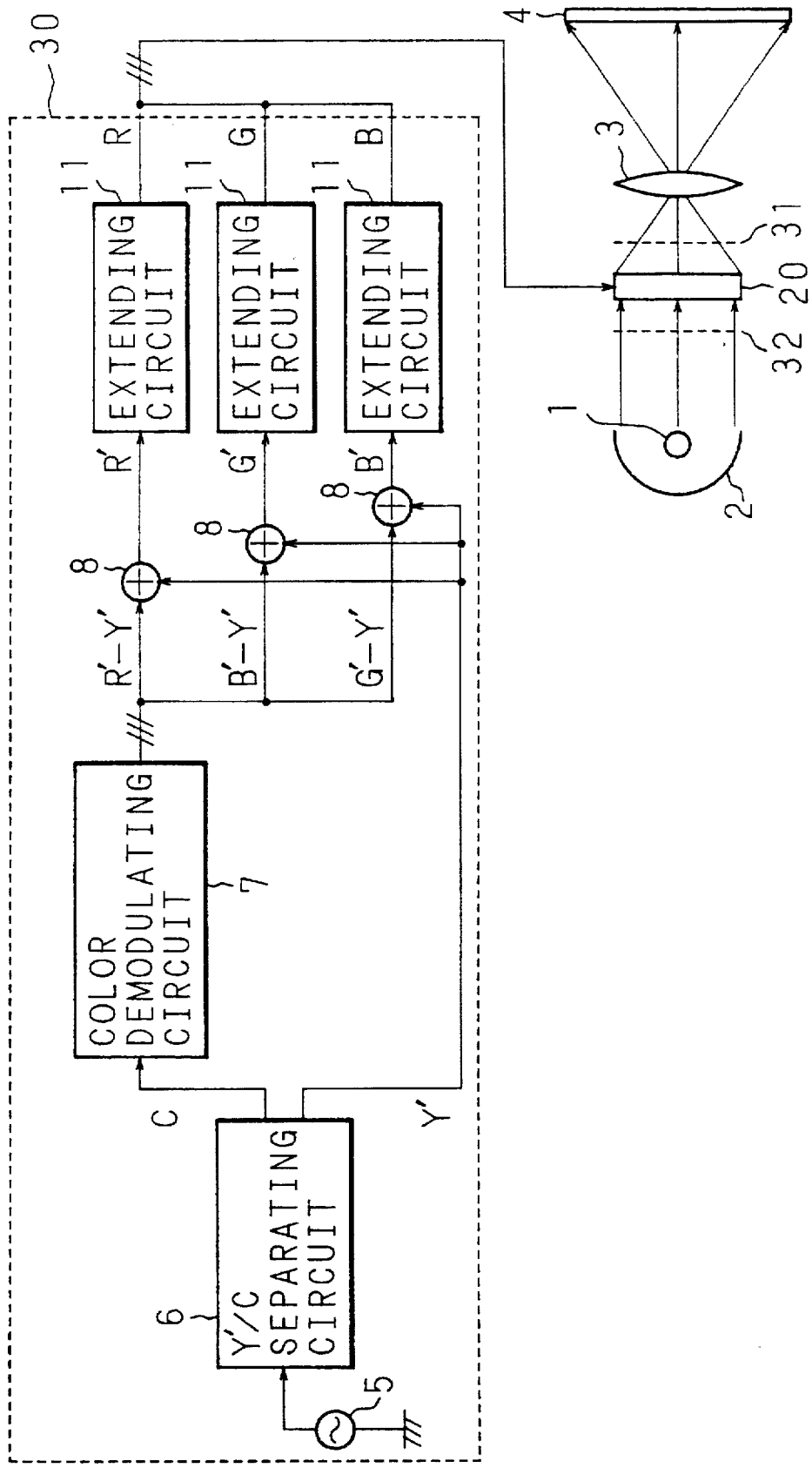
FIG. 1 is a diagram showing the configuration of a prior art projector.
Figure 2:
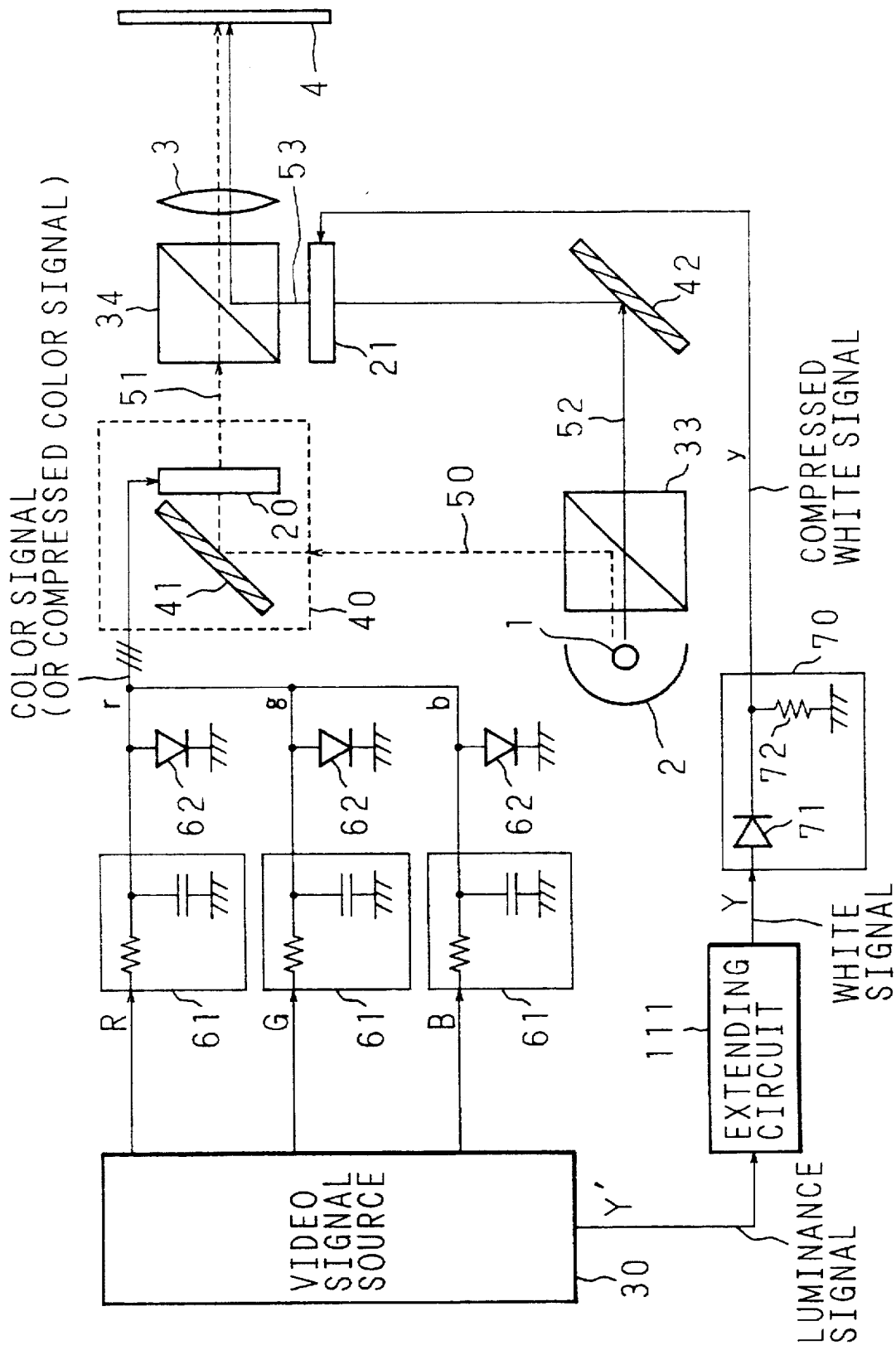
FIG. 2 is a diagram showing the configuration of an embodiment of the projector of the invention.

FIG. 2 is a diagram showing the configuration of an embodiment of the projector of the invention. In FIG. 2, 1 designates a lamp which emits white light, and 2 designates a reflecting mirror which reflects the emitted light. The lamp 1 and the reflecting mirror 2 constitute a projection light source. The reflecting face of the reflecting mirror 2 is a parabolic face. The lamp 1 is located approximately at a focal point of the parabolic face, so that approximately parallel emitted light is obtained. In a forward position in the emitted direction of the emitted light, a polarized beam splitter 33 functioning as polarizing optical means is disposed. Horizontally-polarized lights 52 are transmitted through the polarized beam splitter 33 and then travel straight, and vertically-polarized lights 50 are reflected therefrom. In the straight traveling direction of the vertically-polarized lights 50 which have been reflected from the polarized beam splitter 33, a reflecting mirror 41 and a liquid crystal panel 20 for colored-light modulation are disposed. On the other hand, in the straight traveling direction of the horizontally-polarized lights 52 which have been transmitted through the polarized beam splitter 33, a reflecting mirror 42 and a liquid crystal panel 21 for white-light modulation are disposed. The liquid crystal panel 20 and the reflecting mirror 41 constitute a colored-light modulator 40. A polarized beam splitter 34 is disposed on the light output sides of the liquid crystal panels 20 and 21. Color image lights 51 which have been converted into the horizontally-polarized lights from the vertically-polarized lights by the liquid crystal panel 20 travel straight through the polarized beam splitter 34, and white image light 53 which has been converted into the vertically-polarized light from the horizontally-polarized light by the liquid crystal panel 21 is reflected from the polarized beam splitter 34, so that the image lights 51 and 53 are synthesized with each other by the polarized beam splitter 34. In the forward direction of the polarized beam splitter 34, a lens 3 and a screen 4 are disposed. The light synthesized by the polarized beam splitter 34 is imaged on the screen 4 by the lens 3, so that an image is displayed on the screen 4. The liquid crystal panels 20 and 21 have a polarization function for controlling the polarizing directions of the vertically- and horizontally-polarized lights in accordance with the levels of the color signals r, g, and b and a compressed white signal which are inputted to the liquid crystal panels 20 and 21.

The reference numeral 30 designates a video signal source which outputs color signals R, G, and B which have undergone gamma inverse correction and a luminance signal Y' which has undergone gamma correction. The internal configuration is substantially the same as that shown in FIG. I except that the luminance signal Y' is outputted to the outside. For each of the color signals R, G, and B, as shown in FIG. 2, a low-pass filter 61 having, for example, an RC primary configuration consisting of a resistor and a capacitor, and a diode 62 in which the cathode side is grounded and which has a forward voltage of, for example, 0.6 V are connected to the video signal source 30 in this order. The diode 62 has a function for compressing a high level (e.g., a level equal to or higher than 0.6 V) of the corresponding color signal. Portions exceeding the predetermined level (the level of saturated color) are compressed to be a substantially constant value. Signals equal to or lower than the predetermined level are substantially linearly outputted, and the color signals r, g, and b are outputted to pixels of the respective three primary colors in the liquid crystal panel 20.

To the video signal source 30, a so-called extending circuit 111 which conducts gamma inverse correction on the luminance signal Y' which has undergone gamma correction, and a compressing circuit 70 consisting of a diode 71 having a forward voltage of 0.6 V and a resistor 72 are connected in this order. Accordingly, after gamma inverse correction, portions equal to or lower than the predetermined level (the level of saturated color) are compressed, and signals equal to or higher than the predetermined level are substantially linearly outputted, and the compressed white signal y is outputted to the liquid crystal panel 21. In the embodiment, the compression levels for the color signals R, G, and B and the white signal Y are equally set (e.g., 0.6 V), but alternatively they can separately be set to be independent values.

Next, the operation will be described. Lights (natural lights consisting of vertically-polarized lights and horizontally-polarized lights) are emitted from the projection light source consisting of the lamp 1 and the reflecting mirror 2, and enter the polarized beam splitter 33. Among the lights, horizontally-polarized lights 52 travel straight, and vertically-polarized lights 50 are reflected. The horizontally-polarized lights 52 are then reflected from the reflecting mirror 42, and subjected to a polarization control by the liquid crystal panel 21 on the basis of the compressed white signal y shown in FIG. 2, to be converted into vertically-polarized lights. Then, white image light 53 which has undergone white-light modulation is reflected from the polarized beam splitter 34. On the other hand, the vertically-polarized lights 50 are reflected from the reflecting mirror 41 so that vertically-polarized lights of lights emitted from the projection light source are separately converted in the liquid crystal panel 20 on the basis of red, green, and blue color signals r, g, and b, into horizontally-polarized lights, and subjected to colored-light modulation. Then, the color image lights 51 which have undergone colored-light modulation travel straight through the polarized beam splitter 34. The white image light 53, and the color image lights 51 are synthesized with each other in the polarized beam splitter 34, thereby constituting color image lights. The color image lights pass through the lens 3 and are then projected onto the screen 4, so that an image is displayed on the screen 4.

Color signals R, G, and B which are outputted from the video signal source 30 and have already undergone gamma inverse correction pass through respective low-pass filters (LPF) 61. The band width of each LPF 61 is set to be lower than the band width of the spatial frequency which is determined by the pitch and the number of pixels of the liquid crystal panel 20, whereby aliasing interference is prevented from occurring. The maximum amplitude level of each color signal is limited to 0.6 V by the diode 62 connected to the corresponding LPF 61, so that the color signals r, g, and b having the amplitude level of 0.6 V or lower are outputted as driving color signals to the liquid crystal panel 20. This high-level compression action uniformalizes color signals exceeding the saturated color level (in the embodiment, the second predetermined level is 0.6 V), so that the intensities of the color-modulated lights outputted from the liquid crystal panel 20 are uniformalized. A luminance signal Y' which has undergone gamma correction is subjected to gamma inverse correction in the extending circuit 111 to produce a white signal Y. The compressing circuit 70 compresses the low level portion (in the embodiment, equal to or lower than 0.6 V which is the first predetermined level) of the white signal Y, and substantially blocks it, whereby the white signal Y exceeding 0.6 V is outputted as the compressed white signal y to the liquid crystal panel 21. According to this configuration, the liquid crystal panel 21 for white-light modulation emits white light in response to the compressed white signal y exceeding the saturated color level which is determined by the first predetermined level. The white light is superposed on colored light produced in response to the color signals r, g, and b lower than the saturated color level (in FIG. 2, a level equal to 0.6 V which is the first predetermined level) which is determined by the second predetermined level, so that illuminance which is equal to or higher than that obtained when only the liquid crystal panel 20 is used is attained on the screen 4. The extending circuit 11 and 111 may have the function of compensating the non-linearity of the liquid crystal panels 20 and 21, in addition to that of gamma inverse correction.

As described above, colored-light modulation and white-light modulation are separately conducted by different optical systems, i.e., the colored-light modulation means (liquid crystal panel 20) and the white-light modulation means (liquid crystal panel 21), and the modulated lights outputted from the optical systems are synthesized with each other. Therefore, illuminance can be approximately doubled as compared with that of an image obtained when colored-light modulation means (one liquid crystal panel) only is used. The resolution of the colored-light modulation means can be made lower than that of the white-light modulation means. Even when the colored-light modulation means is configured so as to have low resolution in order to reduce the production cost, therefore, the practical resolution can be improved only by improving the resolution of the white-light modulation means.

Since the high-level portion of a color signal is compressed, troubles such as variation of the transmittance of a liquid crystal panel, and generation of noises can be eliminated even when a signal exceeding the saturated color level is inputted. The compression levels of white and color signals can be adjusted independently. Consequently, an optimum combination of compression levels of disposed colored-light modulation means and white-light modulation means can be obtained, so that a projection image is produced in optimum condition for attaining the object of the invention.

The band of a color signal is made narrower than that of a white signal, so that signals equal to or higher than the band of the spatial frequency corresponding to the pitch and the number of pixels of the colored-light modulation means can be blocked. Accordingly, the occurrence of aliasing interference can previously be prevented.

The color signal which is inputted to the colored-light modulation means is obtained by conducting gamma inverse correction on a signal obtained by adding the color difference signals which have undergone gamma correction, to the luminance signal. Accordingly, in the case where the composite video signal is used as an input, the color difference signal is obtained by color demodulation, and hence the input circuit of the projector can be simplified so as to be economically produced.

The colored-light modulation is conducted by a single liquid crystal panel. The light utilization efficiency becomes ⅓ or less because the pixels are shared among three colors, i.e., red, green, and blue. However, the color modulation can be conducted by one panel, so that the number of components can be reduced, and the projector can be simply and economically configured.

The color signals which have undergone gamma correction, and the luminance signal which has undergone gamma correction and will be used as the base of producing the white signal are produced from the composite video signal. The composite video signal in which the color saturated level is ½ of the maximum luminance level and the color band is ⅛.4 of the luminance band is a signal complying with the configuration of the invention. Accordingly, the image quality is improved, and also the compatibility with the composite video signal which is conventionally used is excellent so that the effects as the object of the invention are remarkably attained.

Signals inputted to the two liquid crystal panels are compressed by respective circuits of simple configuration, so that the signals are subjected to light modulation in the linear polarization control regions of the two liquid crystal panels. Consequently, color image lights and white image light having an excellent image quality are produced, and thereafter these image lights can be synthesized in the polarization beam splitter.

Moreover, the luminance signal Y' which has undergone gamma correction is extended by subjecting it to gamma inverse correction, and the low level portion of the extended signal is compressed. In other words, the low level portion of a signal which has been enlarged and extended is effectively compressed, and an extended white signal of high level is directly transmitted to the white-light modulation means. Consequently, it is possible to increase luminance of reproduced image light.

Embodiment 2

Figure 3:
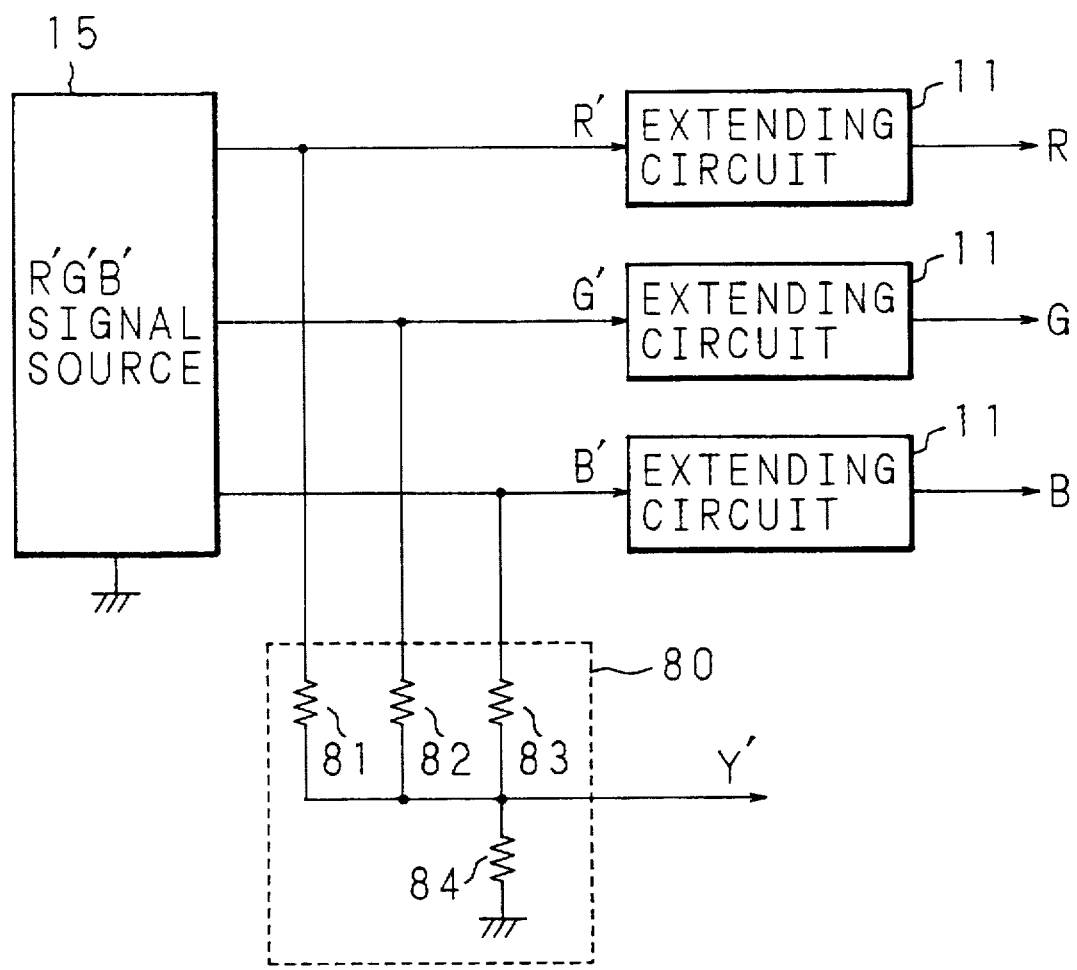
FIG. 3 is a diagram showing a first configuration example for obtaining a luminance signal in the projector of the invention.

FIG. 3 is a diagram showing a circuit of an example wherein, in the case where a source of signals inputted to the projector in FIG. 2 is an R', G', and B' signal source which does not include a luminance signal Y' which has undergone gamma correction but includes only color signals R', G', and B' which have undergone gamma correction, a required luminance signal Y' is produced from the color signals R', G', and B' which have undergone gamma correction. In FIG. 3, 15 designates the R', G', and B' signal source. To the R', G', and B' signal source 15, extending circuits 11 which conduct gamma inverse correction on the color signals R', G', and B', respectively are connected. Color signals R, G, and B which have undergone gamma inverse correction are obtained from the outputs of the respective extending circuits 11. A matrix circuit 80 having four resistors 81, 82, 83, and 84 is connected to the R', G', and B' signal source 15. The configuration of the matrix circuit 80 is described in the above-identified literature "COLOR IMAGE RECEIVING APPARATUS", p. 10. The values of the respective resistors are set in the following manner. The resistor 81 has a resistance of 2,960 $\Omega$, the resistor 82 has a resistance of 5,840 $\Omega$, the resistor 83 has a resistance of 15,900 $\Omega$, and the resistor 84 has a resistance of 1,800 $\Omega$. In this way, the color signals R', G', and B' which have undergone gamma correction are synthesized so as to equivalently obtain the luminance signal Y'. That is, the color signals R, G, and B and the luminance signal Y' which are outputted from the configuration of FIG. 3 are equivalent to the signals outputted from the video signal source 30 in FIG. 2. Accordingly, the projector can operate only on the basis of the color signals R', G', and B' which have undergone gamma correction.

According to the projector of Embodiment 2, the luminance signal Y' can be obtained in the matrix circuit receiving the color signals R', G', and B' which have undergone gamma correction. Also in the case where three primary color signals which have undergone gamma correction are inputted, therefore, the technique of the invention can easily be implemented.

Embodiment 3

Figure 4:
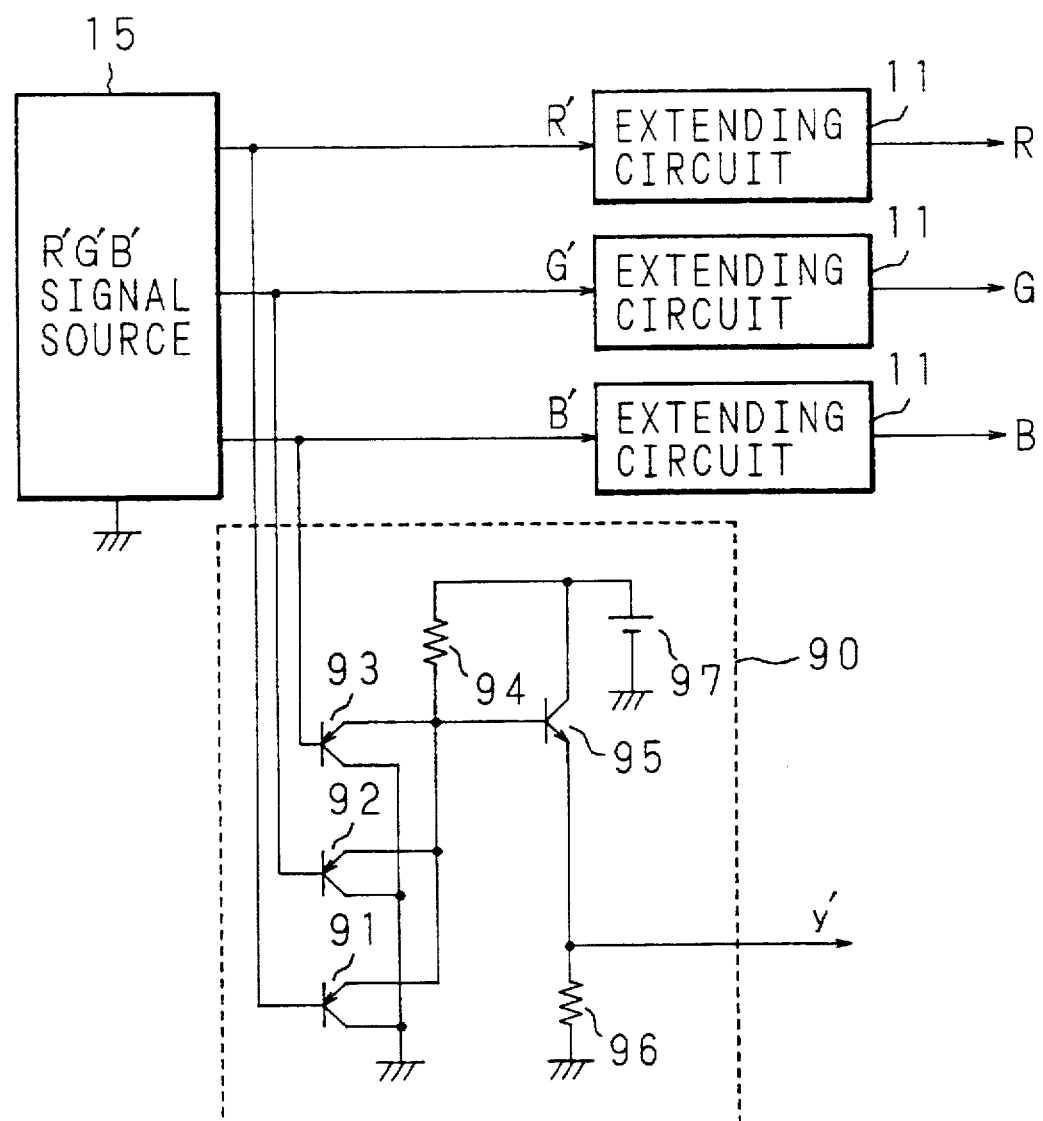
FIG. 4 is a diagram showing a second configuration example for obtaining a luminance signal in the projector of the invention.

FIG. 4 is a diagram showing a circuit of another example in which, in the case where a source of signals inputted to the projector in FIG. 2 does not include a luminance signal Y, a white signal (luminance signal y') before compression is produced from color signals R', G', and B' which have undergone gamma correction. Extending circuits 11 which conduct gamma inverse correction on the color signals R', G', and B', respectively are connected to the R', G', and B' signal source 15. From the outputs of the extending circuits 11, color signals R', G', and B' which have undergone gamma inverse correction are obtained. A minimum value circuit 90 is connected to the R', G', and B' signal source 15. The minimum value circuit 90 has PNP transistors 91, 92, and 93 respectively corresponding to the color signals R', G', and B', a resistor 94, an NPN transistor 95 having a complementary relationship to the PNP transistors 91, 92, and 93, a load resistor 96, and a power source 97. The color signals R', G', and B' are inputted to the bases of the PNP transistors 91, 92, and 93, respectively. The emitters are commonly connected to each other, and the collectors are grounded. The base of the NPN transistor 95 is connected to the common emitter of the PNP transistors 91, 92, and 93. The resistor 94 is connected across the collector of the NPN transistor 95 and the common emitter. The emitter of the NPN transistor 95 is connected to one end of the load resistor 96 the other end of which is grounded. The collector of the NPN transistor 95 is connected to the positive side of the power source 97 which is grounded at the negative side.

In Embodiment 3, the luminance signal y' is obtained as the minimum level of the color signals which have undergone gamma correction. In the minimum value circuit 90 having the above-described configuration, the color signals R', G', and B' are inputted to the emitter follower which consists of the PNP transistors 91, 92, and 93 and in which the emitters are commonly connected. The output is obtained across the resistor 94 which is connected to the power source 97 and the common emitter. Only the PNP transistor to which the color signal having the lowest level among the color signals R', G', and B' is inputted functions as an emitter follower, and its output is obtained via the resistor 94. The DC level of the output is raised by the Vbe voltage, or about 0.6 V between the base and the emitter of the PNP transistor which functions as an emitter follower. Therefore, the DC level is lowered by a value equal to the Vbe voltage of the PNP transistor, or about 0.6 V, by an emitter follower realized by the NPN transistor 95 complementary to the PNP transistor, with the result that an output which is free from level shift is obtained via the load resistor 96. The luminance signal y' outputted from the minimum value circuit 90 indicates the minimum level of the color signals R', G', and B' which have undergone gamma correction. A signal consisting of the other two color signals corresponding to the minimum level and the color signal showing the minimum level results in an achromatic signal, or a signal (luminance signal) of the same kind as the luminance signal which is used in FIG. 2 and has undergone gamma correction. Consequently, the signal can be converted by the extending circuit 111 into a signal used for obtaining a white signal which has undergone gamma inverse correction.

In the opposite view point, for example, the levels of all color signals R', G', and B' which have undergone gamma correction corresponding to white in a color bar signal are the same, or have a value corresponding to 1. Therefore, the achromatic signal which is produced by using the minimum-level signal y' of FIG. 4 in Embodiment 3 has a luminance level corresponding to level 1. Also the white signal that has undergone gamma inverse correction and is outputted from the extending circuit 111 to which that luminance level is inputted has a level of 1 ($=1^{2.4}$). When this level is regarded as 1 V as a result of, for example, a signal-voltage conversion, an achromatic signal produced from color signals of about 0.6 V (corresponding to the second predetermined level) or lower conducts light modulation on the liquid crystal panel 20 for colored-light modulation, and color image lights (in this case, color image lights having the same r, g, and b levels, i.e., white light) are outputted from the liquid crystal panel 20. An achromatic signal of 0.6 V (corresponding to the first predetermined level) or higher conducts light modulation on the liquid crystal panel 21 for white-light modulation, and white image light is outputted from the liquid crystal panel 21.

Specifically, as for the white level in the color bar signal, if the first and the second predetermined levels are equal to each other, achromatic signals higher and lower than the predetermined level are simultaneously driven by the liquid crystal panel 20 for colored-light modulation, and the liquid crystal panel 21 for white-light modulation, so as to reproduce a white image. White image light in the color bar belonging to a high-luminance category is synthesized by modulated lights which have been modulated by achromatic signals that are respectively positioned in the both sides of the first predetermined level. Accordingly, the liquid crystal panels are not required to conduct the light modulation at a supersaturation level for the signal of high luminance, so that the saturated sense is not produced for the white level in image lights.

According to the projector of Embodiment 3, a white signal is produced from an achromatic signal corresponding to the minimum value of color signals R', G', and B' which have undergone gamma correction.

Therefore, color saturation of high luminance is prevented from being lowered, and an image of high color purity and a projection image of excellent gradation can be obtained.

Embodiment 4

Figure 5:
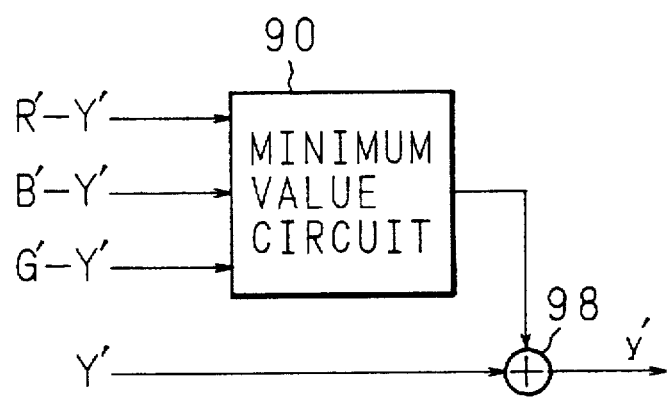
FIG. 5 is a diagram showing a third configuration example for obtaining a luminance signal in the projector of the invention.

FIG. 5 is a diagram showing the configuration of a circuit for obtaining a luminance signal which is equivalent to the luminance signal y' obtained by the configuration shown in FIG. 4, from color difference signals. In the figure, 90 designates a minimum value circuit for obtaining the minimum value of the inputted color difference signals R'-Y, B'-Y, and G'-Y. The internal configuration of the circuit is the same as that shown in FIG. 4. The reference numeral 98 designates an adder which adds a luminance signal Y' to the output of the minimum value circuit 90. In the embodiment, the minimum value of color difference signals R'-Y, B'-Y, and G'-Y is selected by the minimum value circuit 90, and the luminance signal Y' is added to the minimum value in the adder 98, thereby producing the luminance signal y' which is obtained in FIG. 4. The processing utilizing the obtained luminance signal y' is the same as that in Embodiment 3, and therefore the description of the processing is omitted.

According to the projector of Embodiment 4, since a white signal is obtained by adding a luminance signal to an achromatic signal corresponding to the minimum value of color difference signals which have undergone gamma correction, the projector can be configured in an easier manner as compared with a projector to which a composite video signal is inputted. Furthermore, color saturation of high luminance is prevented from being lowered, and an image of high color purity can be obtained.

Embodiment 5

Figure 6:
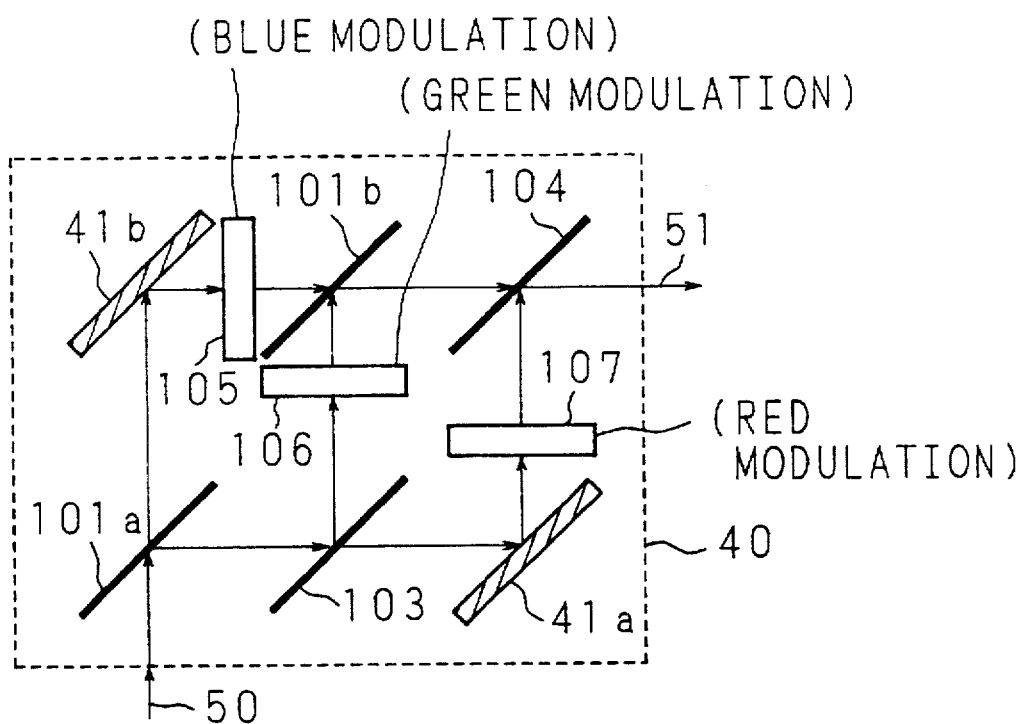
FIG. 6 is a diagram showing another configuration example of a color modulator in the projector of the invention.

FIG. 6 is a diagram showing a configuration of another example of the colored-light modulator 40 in FIG. 2 for increasing the illuminance of colored lights. The colored-light modulator 40 in the embodiment has: a blue-transmission and green and red-reflection mirror 101a on which vertically-polarized lights 50 are incident; a red-transmission and green and blue-reflection mirror 103, a reflecting mirror 41a, and a red-modulation liquid crystal panel 107 which are arranged in this order in the reflected direction of the blue-transmission and green and red-reflection mirror 101a; a reflecting mirror 41b, a blue-modulation liquid crystal panel 105, and a blue-transmission and green and red-reflection mirror 101b which are arranged in this order in the light transmission direction of the blue-transmission and green and red-reflection mirror 101a; a green-modulation liquid crystal panel 106 disposed between the red-transmission and green and blue-reflection mirror 103 and the blue-transmission and green and red-reflection mirror 101b; and a blue and green-transmission and red-reflection mirror 104 which synthesizes the output lights from the red-modulation liquid crystal panel 107 and the blue-transmission and green and red-reflection mirror 101b and outputs color image lights 51 which are vertically-polarized lights.

Next, the operation will be described. Vertically-polarized lights 50 impinge on the blue-transmission and green and red-reflection mirror 101a. Blue light of the vertically-polarized lights 50 passes through the blue-transmission and green and red-reflection mirror 101a, and is reflected from the reflecting mirror 41b and subjected to modulation in the blue-modulation liquid crystal panel 105. Thereafter, blue light passes through the blue-transmission and green and red-reflection mirror 101b, and the blue and green-transmission and red-reflection mirror 104 so that the blue component of the color image lights 51 is produced. Green light of the vertically-polarized lights 50 is reflected from the blue-transmission and green and red-reflection mirror 101a, and the red-transmission and green and blue-reflection mirror 103, and subjected to modulation in the green-modulation liquid crystal panel 106. Thereafter, green light is reflected from the blue-transmission and green and red-reflection mirror 101b, and passes through the blue and green-transmission and red-reflection mirror 104 so that the green component of the color image lights 51 is produced. Red light of the vertically-polarized lights 50 is reflected from the blue-transmission and green and red-reflection mirror 101a, passes through the red-transmission and green and blue-reflection mirror 103, and is reflected from the reflecting mirror 41a and subjected to modulation in the red-modulation liquid crystal panel 107. Thereafter, red light is reflected from the blue and green-transmission and red-reflection mirror 104, so that the red component of the color image lights 51 is produced. In this way, blue, green, and red image lights which are separately produced are synthesized with each other to obtain the color image lights 51. Since the optical paths for blue, green, and red are equal to each other, preferable results are achieved.

According to the projector of Embodiment 5, colored-light modulation is conducted by the three liquid crystal panels for blue, green, and red image lights. Therefore, the efficiency is tripled as compared with that attained in a system using a single liquid crystal panel, and an image of high illuminance can be obtained.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A projector in which light modulation is conducted by liquid crystal panels in accordance with a video signal, comprising:

a first signal circuit for obtaining a color signal from the video signal;

colored-light modulation means for conducting colored-light modulation according to the color signal, thereby obtaining colored light;

a second signal circuit for obtaining a white signal which indicates a white gradation, from the video signal;

a third signal circuit for compressing a portion of the white signal equal to or lower than a first level, thereby obtaining a compressed white signal;

white-light modulation means for conducting white-light modulation according to the compressed white signal, thereby obtaining white light; and synthesizing means for synthesizing the colored light and the white light with each other.

2. A projector according to claim 1, wherein said first signal circuit includes color signal acquisition means for acquiring compressed color signals r, g, and b as said color signal, said compressed color signals being obtained by compressing portions of three primary color signals R, G, and B which have undergone gamma inverse correction, the portions being higher than a vicinity of a second level.

3. A projector according to claim 2, wherein said first level is different from said second level.

4. A projector according to claim 1, wherein a band of said color signal is narrower than a band of said compressed white signal.

5. A projector according to claim 2, wherein bands of said compressed color signals are narrower than a band of said compressed white signal.

6. A projector according to claim 1, wherein said first signal circuit includes means for adding color difference signals which have undergone gamma correction to a luminance signal which has undergone gamma correction, and means for obtaining said color signal by conducting gamma inverse correction on the added signals.

7. A projector according to claim 1, wherein said second signal circuit includes means for synthesizing color signals which have undergone gamma correction, thereby obtaining said white signal.

8. A projector according to claim 1, wherein said second signal circuit includes means for generating said white signal from an achromatic signal corresponding to a minimum value of three primary color signals R', G', and B' which have undergone gamma correction.

9. A projector according to claim 1, wherein said second signal circuit includes means for adding an achromatic signal to a luminance signal, the achromatic signal corresponding to a minimum value of color difference signals which have undergone gamma correction, and for producing said white signal from the added signal.

10. A projector according to claim 1, wherein said colored-light modulation means comprises a single liquid crystal panel consisting of three-primary color pixels.

11. A projector according to claim 1, wherein said colored-light modulation means comprises three liquid crystal panels for red, green and blue.

12. A projector according to claim 1, wherein said first signal circuit includes means for obtaining said color signal which has undergone gamma inverse correction, from a composite video signal, and said second signal circuit includes means for obtaining said white signal which has undergone gamma correction, from the composite video signal.

13. A projector according to claim 1, wherein said third signal circuit includes first signal processing means for compressing a signal at a level in the vicinity of said first level, said first signal processing means having a non-linear input/output characteristic.

14. A projector according to claim 13, wherein said first signal processing means comprises a diode.

15. A projector according to claim 13, wherein said first signal processing means is cascaded to extending means for extending a luminance signal which has undergone gamma correction.

16. A projector according to claim 2, wherein said third signal circuit includes first signal processing means for compressing a signal at a level in the vicinity of said first level, said first signal processing means having a non-linear input/output characteristic, and said color signal acquisition means includes second signal processing means for compressing a signal at a level in the vicinity of said second level, said second signal processing means having a non-linear input/output characteristic.

17. A projector according to claim 16, wherein said first and second signal processing means comprise a diode.

* * * * *